US009566546B2

(12) United States Patent
Hoteit

(10) Patent No.: US 9,566,546 B2
(45) Date of Patent: Feb. 14, 2017

(54) SOUR GAS COMBUSTION USING IN-SITU OXYGEN PRODUCTION AND CHEMICAL LOOPING COMBUSTION

(71) Applicant: Saudi Arabian Oil Company, Dhahran (SA)

(72) Inventor: Ali Hoteit, Abqaiq (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 398 days.

(21) Appl. No.: 14/159,599

(22) Filed: Jan. 21, 2014

(65) Prior Publication Data

US 2015/0204539 A1 Jul. 23, 2015

(51) Int. Cl.
| | |
|---|---|
| *B01D 53/14* | (2006.01) |
| *F23C 10/10* | (2006.01) |
| *C01B 17/44* | (2006.01) |
| *C01B 13/02* | (2006.01) |
| *C01B 17/50* | (2006.01) |
| *C01F 11/46* | (2006.01) |

(Continued)

(52) U.S. Cl.
CPC ....... *B01D 53/1481* (2013.01); *C01B 13/0203* (2013.01); *C01B 17/44* (2013.01); *C01B 17/508* (2013.01); *C01F 11/46* (2013.01); *F23C 10/10* (2013.01); *F23C 2900/99008* (2013.01); *Y02E 20/346* (2013.01)

(58) Field of Classification Search
CPC ................. B01D 53/1481; B01D 53/50; F23C 2900/99008; F23C 10/10; F23C 10/005; F23C 10/01; F23C 6/042; F23C 13/06; F23C 13/08; C01F 11/46; C01F 11/464; C01B 17/44; C01B 17/508; C01B 13/0203

USPC ............................. 431/7, 10, 4, 3, 116, 170
IPC ........... B01D 53/14,53/50; C01B 13/08, 17/44, 17/50; F23C 10/10, 6/04, 13/06
See application file for complete search history.

(56) References Cited

U.S. PATENT DOCUMENTS 3,551,100 A * 12/1970 Roberts ...................... B01J 8/26
423/566
3,574,530 A * 4/1971 Suriani et al. ...... C01B 17/0404
423/243.03

(Continued)

FOREIGN PATENT DOCUMENTS

| | | |
|---|---|---|
| EP | 2610216 | 7/2013 |
| WO | WO 2011/066376 | 6/2011 |
| WO | WO 2013/098329 | 7/2013 |

OTHER PUBLICATIONS

Golnar Azimi et al: "Chemical-looping with oxygen uncoupling using combined Mn—Fe oxides, testing in batch fluidized bed". Energy Procedia, vol. 4, Apr. 30, 2011, pp. 370-377, XP028212924, ISSN: 1876-6102, DOI: 10.10165.EGYPR0.2011.01.064 [retrieved on Apr. 1, 2011].

*Primary Examiner* — Gregory Huson
*Assistant Examiner* — Daniel E Namay
(74) *Attorney, Agent, or Firm* — Leason Ellis LLP

(57) ABSTRACT

A chemical looping combustion (CLC) process for sour gas combustion includes a number of reaction zones and is configured to provide in-situ oxygen production and in-situ removal of $SO_2$ from a product gas stream by reacting the $SO_2$ with a calcium-based sorbent at a location within one reaction zone. The CLC process is also configured such that the in-situ oxygen production results from the use of a metal oxide oxygen carrier which is purposely located such that it does not directly contact the sour gas, thereby eliminating the generation of undesirable sulfur-based metal oxides.

20 Claims, 1 Drawing Sheet

(51) Int. Cl.
*C01B 13/08* (2006.01)
*F23C 6/04* (2006.01)
*F23C 13/06* (2006.01)

(56) References Cited

U.S. PATENT DOCUMENTS

| | | | | |
|---|---|---|---|---|
| 3,717,700 | A * | 2/1973 | Robison | F23C 10/005 110/345 |
| 3,890,111 | A * | 6/1975 | Knudsen | C10J 3/54 201/31 |
| 3,969,089 | A | 7/1976 | Moss et al. | |
| 4,012,487 | A * | 3/1977 | Merkl | B01D 53/1481 252/190 |
| 4,285,917 | A | 8/1981 | Knight | |
| 5,447,702 | A * | 9/1995 | Campbell | B01D 53/52 423/230 |
| 6,797,253 | B2 | 9/2004 | Lyon | |
| 8,404,909 | B2 * | 3/2013 | Jadhav | C01B 31/20 201/16 |
| 8,757,072 | B2 * | 6/2014 | Abanades Garcia | B01D 53/62 110/344 |
| 8,807,988 | B2 * | 8/2014 | Siriwardane | F23C 13/08 252/182.33 |
| 9,175,850 | B1 * | 11/2015 | Touchton | F23C 10/10 |
| 9,423,122 | B2 * | 8/2016 | Kauppinen | F22B 31/0092 |
| 2002/0064494 | A1 * | 5/2002 | Zeng | B01D 53/02 423/418.2 |
| 2002/0141922 | A1 * | 10/2002 | Smith | B01D 53/1481 423/243.08 |
| 2005/0026008 | A1 * | 2/2005 | Heaton | B01D 53/502 429/417 |
| 2009/0072538 | A1 * | 3/2009 | Morin | F02C 3/28 290/52 |
| 2009/0123354 | A1 * | 5/2009 | Jan | C01B 3/386 423/263 |
| 2011/0132737 | A1 * | 6/2011 | Jadhav | C01B 31/20 201/28 |
| 2011/0171588 | A1 | 7/2011 | Gauthier et al. | |
| 2012/0164059 | A1 * | 6/2012 | Chen | C01B 31/20 423/438 |
| 2012/0214106 | A1 | 8/2012 | Sit et al. | |
| 2013/0055936 | A1 * | 3/2013 | Vimalchand | B01J 8/0055 110/245 |
| 2013/0255272 | A1 | 10/2013 | Ajhar et al. | |
| 2013/0316292 | A1 * | 11/2013 | Siriwardane | F23C 13/08 431/7 |
| 2014/0154634 | A1 * | 6/2014 | Niass | C01B 13/0248 431/7 |
| 2014/0314650 | A1 * | 10/2014 | Smyrniotis | B01D 53/507 423/240 R |
| 2015/0204539 | A1 * | 7/2015 | Hoteit | F23C 10/10 431/7 |
| 2015/0218456 | A1 * | 8/2015 | Nielsen | C10J 3/482 201/4 |
| 2015/0226423 | A1 * | 8/2015 | Cao | F23C 10/005 431/170 |
| 2015/0292735 | A1 * | 10/2015 | Cao | F23C 10/10 431/170 |
| 2016/0008755 | A1 * | 1/2016 | Brechtel | B01D 53/1468 60/722 |
| 2016/0030904 | A1 * | 2/2016 | Fan | F23C 99/00 422/142 |
| 2016/0082385 | A1 * | 3/2016 | Wang | B01D 53/50 423/243.1 |
| 2016/0102255 | A1 * | 4/2016 | Hoteit | C10G 9/36 208/126 |
| 2016/0107893 | A1 * | 4/2016 | D'Souza | C01B 17/508 252/372 |
| 2016/0146456 | A1 * | 5/2016 | Guillou | F23C 10/005 431/7 |
| 2016/0150742 | A1 * | 6/2016 | Lefsrud | A01G 9/18 47/17 |
| 2016/0152470 | A1 * | 6/2016 | Gierman | C01B 17/76 423/224 |

\* cited by examiner

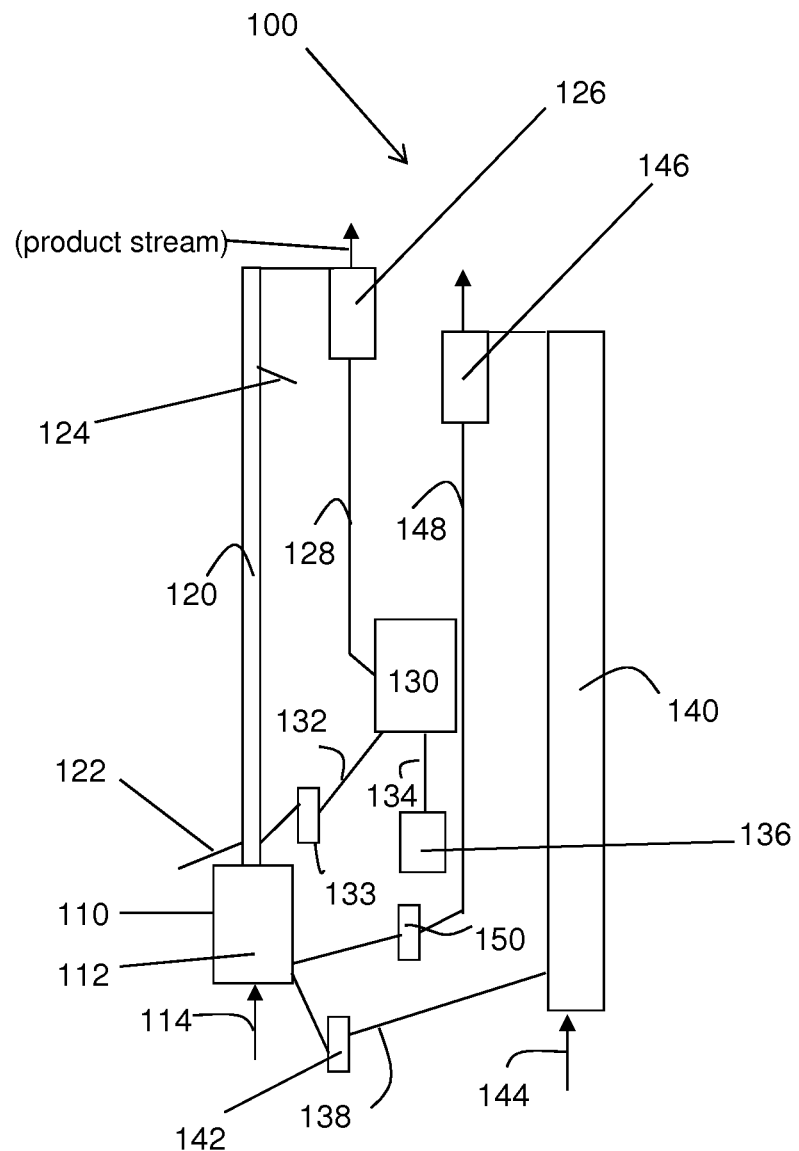

SOUR GAS COMBUSTION USING IN-SITU OXYGEN PRODUCTION AND CHEMICAL LOOPING COMBUSTION

TECHNICAL FIELD

The present invention relates to a process to produce heat and steam from the combustion of sour gas or low BTU gas using a chemical looping combustion (CLC) process. More specifically, the present invention relates to an improvement in the efficiency of chemical looping combustion of sour gas processes and also to the in-situ reduction of polluting gases, such as $SO_2$.

BACKGROUND

The increased attention paid to global warming in recent decades has led to increased research in the field of power generation. Different measures for fighting against the undesirable effects of global warming have been proposed. One such measure is carbon capture and storage (CCS), which has widely been considered a mid-to-long term mitigating measure against the emission of $CO_2$. CCS has the potential to be both valuable and environmental, and this can be achieved if $CO_2$ can be utilized in industrial applications after it has been captured. Nonetheless, the current problem is that most known CCS methods are costly.

Combustion is a commonly used reaction in the field of power generation. Several carbon capturing techniques exist for capturing $CO_2$ from a combustion unit, including post-treatment, $O_2/CO_2$ firing (oxyfuel), and CO-shift. Chemical looping combustion (CLC) is a specific type of combustion reaction that was originally created in the 1950s to produce $CO_2$, but recently it has received increased attention as a potential $CO_2$ capturing process. In a CLC process, an oxygen carrier acts as an intermediate transporter of oxygen between air and fuel, and thus the air and the fuel are prevented from directly contacting one another. Typically, a solid metal oxide oxygen carrier is used to oxidize the fuel stream in a fuel reactor. This results in the production of $CO_2$ and $H_2O$. The reduced form of the oxygen carrier is then transferred to the air reactor, where it is contacted with air, reoxidized to its initial state, and then returned back to the fuel reactor for further combustion reactions.

In general, the overall heat of a CLC process will be the sum of the two heat states, exothermic during oxidation and endothermic during reduction, which is equivalent to the heat released in a convention combustion reaction. Accordingly, one advantage of the CLC process is that minimal extra energy is required to capture $CO_2$ while still maintaining a combustion efficiency similar to direct combustion processes. More precisely, there is minimum energy penalty for $CO_2$ capturing in a CLC process, estimated at only 2-3% efficiency lost. Additionally, $NO_x$ formation is reduced in the CLC process compared with direct combustion processes as the oxidation reaction occurs in the air reactor in the absence of fuel and at a temperature of less than 1200° C.—above which $NO_x$ formation increases considerably. Thus, the lack of $NO_x$ formation makes $CO_2$ capturing in CLC processes less costly compared with other combustion methods because $CO_2$ does not need to be separated from the NOx gas prior to capture. Further, in contrast with other combustion processes, $CO_2$ products in CLC processes can be separated from other gases and captured without the use of additional step or equipment.

Many types of fuel can be used in combustion processes. Natural gas that contain significant levels of $H_2S$—known as sour gas—may also be used as a gaseous fuel in combustion processes; however, sour gas is low in calorific value and is very corrosive, and thus was not previously considered to be a particularly useful fossil fuel. However, the increasing worldwide demand for energy has forced the use of sour gas as an energy source.

One of the biggest problems with using sour gas in combustion processes is that $H_2S$ is a very corrosive gas that can be damaging to the mechanical parts of the combustion system at high temperatures and pressures under gas turbine system conditions. Additionally, when exposed to air, $H_2S$ readily oxidizes to form $SO_x$ (namely, $SO_2$) which is an air pollutant.

Conventionally, in order to avoid the corrosive effects and the pollution associated with combustion of sour gas, pre-treatment of the sour gas was required to substantially remove the sulfur compounds from the gas stream—a process known as "sweetening." For example, an amine gas treating process can be used to "sweeten" the sour gas (i.e., remove the $H_2S$). The shortcoming of processes for sweetening sour gas is that they are very costly. However, in combustion of sour gas using the chemical looping concept, pre-treatment of $H_2S$ is not necessary. In particular, the sulfur containing compounds can be removed post-combustion reaction, thus eliminating the costly "sweetening" process.

CLC processes using sour gas fuel streams are known in the art. However, these conventional processes are designed such that the sour gas is in direct contact with the metal oxide oxygen carriers in the fuel reactor. However, such arrangement is less than ideal as direct contact between the metal oxide oxygen carrier and the $H_2S$ contained in the sour gas can generated sulfur-based metal oxides, which, in some cases, are difficult to transform back to their oxidized metallic state. Consequently, the generation of sulfur-based metal oxides can result in a decrease of the total capacity of the CLC process due to the loss of reactivity of the oxygen carrier and the subsequent decrease in the conversion of the sour gas. Further, when sulfur-based metal oxides are formed in the fuel reactor, some $SO_2$ will be generated in the air reactor due to the oxidation of the sulfur based metal oxides in the air reactor during the oxidation step. The presence of $SO_2$ in the air reactor will consequently increase the cost of the $SO_2$ treatment at the air reactor exit.

Until now, there have not been any CLC processes for the combustion of sour gas in which metal oxides do not directly interact with the sour gas fuel. Thus, there is a need for efficient $CO_2$ capture in the field of power generation in light of growing concerns regarding global warming. Further, there is a need for a process for the combustion of sour gas with high efficiency in energy conversion, but without the costly pretreatment of $H_2S$. Finally, there is a need for a CLC process for sour gas in which the metal oxide oxygen carriers do not directly interact with the sour gas fuel. The present invention achieves these needs and others.

SUMMARY

The present invention is directed to an improved design for the chemical looping combustion (CLC) of sour gas or low BTU gas to produce heat and steam. More specifically, the present invention relates to a CLC process of sour gas that features at least in part in-situ oxygen production and in-situ $SO_2$ capture.

In one embodiment, a bed of a metal oxide oxygen carrier is disposed within a lower portion of a fuel reactor and a stream of $CO_2$ and steam is then used to fluidize the bed. The metal oxide acts as an oxygen carrier with the capacity to release phase oxygen. Once fluidized, the bed of metal oxide releases oxygen into the $CO_2$/steam stream and the oxygen is then transported to a riser where the fuel gas (sour gas) is injected. In the riser, the fuel gas (sour gas) is burned under oxy-combustion conditions to produce a product gas stream containing $H_2O$, $CO_2$, and $SO_2$.

The $SO_2$ is then eliminated from the product stream in-situ using a calcium-based sorbent in order to prevent subsequent pollution as a result of emission of $SO_2$. More specifically, the calcium-based sorbent decomposes and then reacts with the $SO_2$ to produce $CaSO_4$, of which some is then transported back to the riser of the fuel reactor to act as a nonmetal oxygen carrier to further the combustion reactions. As a nonmetal oxygen carrier in the riser of the fuel reactor, the $CaSO_4$ reacts in the presence of CO, $H_2$, and $CH_4$ and is reduced to CaS. The resulting CaS product is then sent to a reactive hopper where it is oxidized to $CaSO_4$.

Similarly, the reduced metal oxide material in the fluidized bed of the fuel reactor is transported to an air reactor where it is oxidized back to its original state in the presence of air. Following reoxidation, the metal oxide material is transported back to the fluidized bed in the fuel reactor for further use as a metal-based oxygen carrier.

This invention provides a distinct advantage over other CLC processes involving sour gas in that it allows for the full conversion of the sour gas, whereas most CLC sour gas processes will have a small fraction of not fully converted gas products in the product stream. Additionally, the present invention avoids direct contact between the oxygen carrier (i.e., metal oxide) and the sour gas by placing the oxygen carrier in a lower portion of the fuel reactor and injecting the sour gas into the riser which is downstream of the fuel reactor, thereby avoiding direct contact between the two.

BRIEF DESCRIPTION OF THE DRAWING FIGURES

A more complete understanding of the invention and its many features and advantages will be attained by reference to the following detailed description and the accompanying drawing. It is important to note that the drawing illustrates only one embodiment of the present invention and therefore should not be considered to limit its scope.

FIG. 1 is a schematic of a CLC process in accordance with an embodiment of the invention.

DETAILED DESCRIPTION OF CERTAIN EMBODIMENTS

As previously mentioned, chemical looping combustion (CLC) typically employs a dual fluidized bed system (circulating fluidized bed process) in which a metal oxide is employed as a bed material providing the oxygen for combustion in a fuel reactor. The reduced metal oxide is then transferred to the second bed (air reactor) and reoxidized before being reintroduced back to the fuel reactor completing the loop. Chemical looping combustion (CLC) thus uses two or more reactions to perform the oxidation of hydrocarbon based fuels. In its simplest form, an oxygen carrying species (normally a metal) is first oxidized in air forming an oxide. This oxide is then reduced using a hydrocarbon as a reducer in a second reaction.

The CLC process of the present invention is designed to overcome the deficiencies associated with conventional CLC processes related to combustion of sour gas. As mentioned herein, unlike conventional CLC processes in which the sour gas is in direct contact with the oxygen carrier (e.g. as by being directly introduced into a bed of oxygen carrier material), the present CLC process is designed such that the sour gas is introduced into the reactor such that it does not directly contact the oxygen carrier. Instead, the sour gas is introduced at a location that is remote (e.g., downstream) of the oxygen carrier. In addition, the CLC process according to the present invention achieves the full conversion of the sour gas during the combustion reaction.

The CLC process in accordance with the present invention is one in which a sour gas fuel stream is burned under oxy-combustion conditions in a reactor or the like to produce heat and steam. As described herein, the chemical looping process allows for the in-situ production of oxygen and the elimination of $SO_2$ which is a byproduct of the combustion reaction that can be a pollutant. Other advantages of the present invention will be appreciated in view of the following description.

FIG. 1 illustrates one exemplary CLC system 100 for performing the chemical looping combustion of sour gas or low BTU gas in accordance with the present invention. FIG. 1 likewise shows an exemplary flow scheme that depicts one CLC process in accordance with the present invention. The CLC system 100 can be thought of as having and defined by three distinct reaction zones. More specifically, a first reaction zone is defined by a fuel reactor 110, a second reaction zone is defined by a riser 120 which is operatively connected to the fuel reactor 110, and a third reaction zone is defined by an air reactor 140.

The fuel reactor 110 can take any number of suitable forms and is designed to allow for the combustion of a fuel or the like therein. The fuel reactor 110 is thus defined by a structure (housing) that defines a hollow interior in which the fuel combustion occurs. A bed material (fluidized bed) which provides the oxygen for the combustion in the fuel reactor 110 is disposed within a portion 112 (e.g., a lower portion as illustrated) of the fuel reactor 110.

Any number of different techniques can be used to contain and hold the bed material in place within the fuel reactor 110 including but not limited to placing the bed material on a substrate or support structure that is disposed within the lower portion 112. For example, a perforated horizontal plate can be provided in the lower portion 112 and the bed material rests along such perforated plate. The perforations in the horizontal plate allow for fluid flow through the plate and thus, allow for a fluid, such as a gas, to flow not only through the plate but also through the bed material resting thereon. This allows the bed material to act as a fluidized bed. The bed material serves as the oxygen carrier that provides the oxygen for the combustion in the fuel reactor 110 and therefore, can be in the form of any number of suitable oxygen carriers, including but not limited to suitable metal oxide materials.

In exemplary embodiments, the metal oxide can be copper-based, manganese-based, cobalt-based, or a mixture thereof. Alternatively, any other metal oxide or the like that are suitable for use in CLC can be used. The metal oxide can be used separately or be supported on aluminum or silicium material. The use of either support material can increase the mechanical resistance of the oxygen carrier against different phenomena that can occur in the CLC system, including agglomeration and attrition. The maximum oxygen transfer capacity of the metal oxides is typically between about 0.1 and 12%, but is preferably between about 0.3 and 5%. The particle size fraction of the oxygen carrier can vary from about 30 to 400 microns, and the density of the oxygen carrier can be between about 1400 and 4800 $kg/m^3$. The oxygen carrier in its reduced form can have a reduction degree between about 0.01 and 0.5, but the reduction degree is preferably between about 0.01 and 0.1.

The oxygen carrier bed can be fluidized by a suitable fluid, such as a stream of $CO_2$ or by another suitable fluid stream (gas stream). In one embodiment, a stream consisting of both $CO_2$ and steam is used to fluidize the oxygen carrier bed. Referring to FIG. 1, the stream of $CO_2$ and steam is transported via line 114 and is used to fluidize the metal oxide (oxygen carrier) within the lower portion 112 of the fuel reactor 110 by flowing freely through the bed material (metal oxide).

It will be understood that the diameter of the fuel reactor 110 is designed based on gas superficial velocities. The gas velocity needed for good fluidization gas distribution and good metal oxides mixing in the bottom portion 112 of the fuel reactor 110 is between about 0.15 and 0.8 m/s, and preferably between about 0.25 and 0.5 m/s at least according to one exemplary embodiment. The fluidization gas velocity will not exceed the terminal velocity of the metal oxide particles. Exemplary operating temperatures in the fuel reactor 110 are varied between about 500 and 700° C. At these exemplary operating temperatures, the oxygen carrier bed (e.g., metal oxide) at the bottom (lower portion 112) of the fuel reactor 110 is reduced and releases phase oxygen (i.e., in-situ oxygen production), which is then transported in the $CO_2$/steam stream to the riser 120 that is fluidly coupled to the fuel reactor 110. The residence time of this fluid stream in the fuel reactor 110 where the oxygen is released is between about 1 and 400 seconds, and preferably between about 1 and 180 seconds.

The metal oxide oxygen carrier (bed material) produces (releases) phase oxygen, which is transported in the $CO_2$/steam stream to the riser 120, which represents the second reaction zone of the system 100. The gas stream thus acts as a carrier for the release of phase oxygen. It is within this second reaction zone that the sour gas is introduced and therefore, it will be readily understood that the sour gas is introduced at a location downstream of the oxygen carrier bed material (metal oxides) (and thus also downstream of the fuel reactor 110). Accordingly, the sour gas is introduced at a location that is remote from the oxygen carrier bed material and thus, the sour gas does not directly contact the bed material (i.e., the sour gas does not flow through the bed material or otherwise come in direct contact therewith). In the scheme shown in FIG. 1, the sour gas is introduced into the riser 120 by flowing through a line 122 and into an inlet formed in the riser 120.

In the riser 120, the sour gas is burned under oxy-combustion conditions to produce a gas stream (product stream) containing $CO_2$, $H_2O$, and $SO_2$, as well as small amounts of unburnt products, $H_2$ and CO.

The sour gas stream can have an $H_2S$ concentration of between about 0.1 and 75%, preferably between about 0.1 and 50%. In the riser 120, the combustion of sour gas in the presence of generated oxygen (transported in the $CO_2$/steam stream) occurs and the product gas stream is formed. The resident time of the product gas in the riser is about between about 1 and 15 seconds, preferably between about 2 and 10 seconds. The reaction in the riser 120 is an exothermic reaction, thus results in an increased temperature within the riser 120. More specifically, the operating temperature in the riser 120 is between about 750 and 1000° C. However, compared with a conventional CLC process, the reaction in the fuel reactor 110 is considered endothermic depending upon the nature of the metal oxide utilized in the process.

The combustion of the sour gas in the oxy-combustion environment is typically a fast reaction, which results in the above-described product stream being formed (i.e., a product stream consisting of $CO_2$, $H_2O$, and $SO_2$, as well as a small amount of unburnt products such as CO and $H_2$).

In order to avoid treatment of the $SO_2$ at the exit of the riser 120, the CLC process according to the present invention allows for the elimination of $SO_2$ via reaction with a suitable sorbent material that is disposed within the riser 120. In accordance with the present invention, suitable sorbent materials include but are not limited to calcium based sorbents. For example, one exemplary calcium based sorbent that is suitable for use in the present invention is limestone. The limestone is of a type and in a form that can be injected into the riser 120. The particle size fraction of limestone can be between about 10 and 100 microns, preferably between about 50 and 80 microns. In the scheme of FIG. 1, the calcium based sorbent (e.g., limestone) is injected into the riser 120 via line 124.

The injection of the calcium-based sorbent into the riser 120 prevents the potential pollution effects of $SO_2$. Further, the injection of the calcium-based sorbent is a more cost-effective method for removing sulfur compounds than pre-treatment methods because the volumetric flow of the product gases at the exit of the fuel reactor is significantly less than that seen with the direct combustion of sour gas in a dedicated piece of equipment, such as a boiler.

Once injected into the riser 120, the calcium-based sorbent decomposes and then reacts with the $SO_2$ to produce $CaSO_4$. It is understood by those skilled in the art that the calcium-based sorbent can also be introduced into the riser in a manner other than by injection so long as the calcium-based sorbent absorbs the sulfur generated by the combustion within the riser 120 of the fuel(s) that contains sulfur compounds.

The $CaSO_4$ product obtained from the reaction of $SO_2$ and the calcium-based sorbent is then preferably separated from the product gas stream. In the scheme illustrated in FIG. 1, the $CaSO_4$ produced in the riser 120 is separated from the product stream via a gas-solid separation device 126, such as a cyclone or other suitable device, and is transported via line 128 to a reactive hopper 130 to allow for further processing of the $CaSO_4$ as described below.

Once separated from the product gas stream, a portion of the $CaSO_4$ that resides in the hopper 130 can be recirculated back to the riser 120 of the fuel reactor 110 where it acts as an oxygen carrier for the combustion reaction that occurs in the riser 120. More specifically, from the reactive hopper 130, some of the $CaSO_4$ is circulated back to the riser 120 of the fuel reactor 110 via line 132, and the $CaSO_4$ then acts as an oxygen carrier within the riser 120. The ability of $CaSO_4$ to be recirculated to the riser 120 as an oxygen carrier allows for the full conversion of the sour gas to the product gas mentioned above.

Full conversion of the sour gas makes the process of the present invention more efficient than conventional CLC processes since these conventional processes for sour gas fuel always have a fraction of not fully converted gas products in the product stream from the fuel reactor. Specifically, in the riser 120 of the fuel reactor 110, the $CaSO_4$ acts as an additive oxygen carrier (i.e., a nonmetal oxygen carrier) reacting with the unburnt compounds, CO and $H_2$, present in the riser 120 of the fuel reactor 110 to produce $CO_2$ and steam ($H_2O$), which then flows within the riser 120. Thus, the addition of $CaSO_4$ as an oxygen carrier will increase the overall efficiency of the process by eliminating the unburnt compounds in the riser.

It will be appreciated that the $CaSO_4$ can form a bed of material that acts as an oxygen carrier and reacts with the gases in the riser 120 as the gases contact and flow through the $CaSO_4$. As a result of this reaction, the $CaSO_4$ is reduced to CaS. This CaS product can then be recirculated to the reactive hopper 130 to be reoxidized back to $CaSO_4$ by injecting air into the hopper 130 to cause oxidation.

More specifically and according to one flow path, the CaS product flows within the riser 120 to the gas-solid separation device 126 and then is transported via line 128 to the reactive hopper 130. The air injected into the hopper 130 not only ensures reoxidation of the CaS to $CaSO_4$ but also maintains the fluidization of the $CaSO_4$ (which can act as a bed material) back to the riser 120. Element 133 represents a loop seal which ensures gas tightness between the riser 120 and the hopper 130.

In order to maintain the pressure balance of the chemical looping unit, some of the $CaSO_4$ is eliminated from the system via a collection line 134 coupled to a storing reactor 136. The $CaSO_4$ can then be transported away from the storing reactor 136 for disposal or can otherwise be processed, etc.

Following the release of oxygen, the reduced oxygen carrier from the fluidized bed in the fuel reactor 110 (e.g., reduced metal oxide) is circulated to the air reactor 140 to be reoxidized. More specifically, the metal oxide material (oxygen carrier) from the fuel reactor 110 is transported via line 138 to the air reactor 140. Line 138 contains a loop seal 142, which guarantees gas tightness between the fuel reactor 110 and the air reactor 140. In the air reactor 140, the reduced metal oxide material is then reoxidized in the presence of air, which is injected through line 144 into the air reactor 140. The reoxidized metal oxide material is then transported back to the fuel reactor 110. For example, the recirculation of the reoxidized oxygen carrier (metal oxide) back to the fuel reactor 110 is accomplished via a gas solid separation device 146, such as a cyclone, in conjunction with a transport line 148 and loop seal 150. Similar to the device 126, the device 146 separates the solid metal oxide oxygen carrier from gases that are waste gases or the Like (i.e., gases that are not needed for any of the reactions of the CLC process).

When $CaSO_4$ is used as an oxygen carrier in the combustion reaction that occurs in the riser 120, the $CaSO_4$ can thus be thought of as being a nonmetal oxygen carrier that is used in combination with the metal oxide oxygen carrier of the fuel reactor 110. In other words, two types of oxygen carriers can be used in accordance with the present invention and are located in two difference reaction zones.

In one embodiment, the operating temperature in the air reactor 140 is between about 800 and 1100° C.

One of the advantages of the present invention is that it allows for the full conversion of the sour gas fuel stream, whereas most chemical looping combustion processes will have a small fraction of not fully converted gas products in the product stream. As explained above, the recirculated $CaSO_4$ acts as an additive oxygen carrier which reacts with the unburnt compounds (CO and $H_2$) resulting from the combustion reaction. The CO and $H_2$ reacts with $CaSO_4$ to produce $CO_2$ and steam. The reaction of CO and $H_2$ with $CaSO_4$ allows for the full conversion of the sour gas, thereby increasing the efficiency of the process.

A further advantage of the current invention is that it avoids direct contact between the sour gas and the metal oxides based oxygen carriers. As explained previously, in CLC processes in which there is direct contact between the sour gas and the metal oxide based oxygen carriers, sulfur-based metal oxides are formed in the fuel reactor, which can be difficult to transform back to their oxidized metallic state. Thus, the generation of sulfur-based metal oxides results in a decrease of the total capacity of the process due to the loss of reactivity of the oxygen carrier. Further, the generation of sulfur-based metal oxides results in the fuel reactor results in the generation of $SO_2$ in the air reactor (as the sulfur-based metals are reoxidized). The presence of $SO_2$ in the gas flow of the air reactor will increase the cost of the $SO_2$ treatment at the air reactor exit. In contrast, the present invention is related to a process where the sour gas is reacted with the $O_2$ provided from the oxygen carrier in gaseous state. The reaction between the sour gas and the $O_2$ will produce $SO_2$ in the fuel reactor. Because there is no interaction between the sulfur and the metal oxides, no sulfur based metal oxides are formed or recirculated to the air reactor with the reduced form the metal oxide. The lack of interaction in the present invention between sulfur and the metal oxides results in greater total capacity of the process and reduced cost for the treatment of $SO_2$.

The present invention also has the advantage of being more economic than that of the prior art. The present invention reduces the cost of $SO_2$ treatment in the fuel reactor compared to the prior art by adding a calcium based sorbent to the fuel reactor. Specifically, the calcium based sorbent (a low-cost material) can react with $SO_2$ in the riser to produce $CaSO_4$, which can then be recirculated and used as an additive oxygen carrier. Further, the present invention is more economic than that of the prior in that eliminates the cost of the $SO_2$ treatment at the air reactor.

EXAMPLE

The following example is provided to better illustrate an embodiment of the present invention, but it should not be construed as limiting the scope of the present invention.

In this example, the oxygen carrier that is disposed in the lower portion 112 of the fuel reactor 110 is a manganese-based metal oxide with a density of 4750 kg/m³ (the metal oxide can be a Mn-iron metal oxide). The liquid sour gas feed has the following composition (wt %): $CH_4$ (45.1%), $H_2S$ (40.9%), $N_2$ (0.7%), and $CO_2$ (13.3%). The oxygen required to insure the complete combustion of 14055 Nm³/h of sour gas is equal to 41 K/s. The equivalent flow of metal oxide is 1.41 ton/s.

The temperature at the level of oxygen production media (e.g., within the fuel reactor 110) was between about 400 and 900° C., preferably between about 500 and 750° C. The outlet temperature in the riser 120 is increased to approximately 1100° C. A part of the outlet gas generated from the combustion of sour gas is recirculated and then it will be used to maintain the fluidization of the bed as described above. The outlet gas contains $SO_2$ (3.3% vol.), $CO_2$ (58% vol.), and $H_2O$ (32.6% vol.), as well as unburnt products such as CO (0.1% vol.) and $H_2$ (6% vol.). The proportion of gas outlet recirculation can be between about 20 to 90%, but preferably between about 50 and 80%. The outlet gas can be cooled down from about 1100° C. to 650° C. Because the sour gas contains a high concentration of sulfur, the ratio of Ca/S is between about 2 and 3, preferably between about 2 and 2.5.

The method according to the invention allows increased efficiency of the entire CLC process because the reaction in the riser 120 between the generated oxygen and the sour gas is very exothermic. Thus, the total output energy of the unit is approximately 100 MW without considering heat losses. The method according to the present invention has only an 8.3% penalty as compared with a 14.5% penalty observed with a cryogenic air separation unit (ASU) producing the same quantity of oxygen. The cryogenic ASU for $O_2$ production consumes some of the electricity produced and therefore has a lower thermal efficiency than the present invention. This example shows that the present invention allows for the full conversion of sour gas via a process that is more efficient and economic than that of the prior art.

As explained above, the present invention is directed to a CLC of sour gas that includes both in-situ oxygen production and $SO_2$ elimination. The method according to the invention allows full conversion of the sour gas and low BTU gas in contrast with previous CLC processes. The method according to the invention reduces the reaction time in the fuel reactor which allows for the reductions in the size of the fuel reactor and the overall cost of the chemical looping unit. Additionally, the method according to invention allows an exothermic reaction in the fuel reactor between the gas and the released oxygen which increases the total efficiency of the chemical looping unit.

While the present invention has been described above using specific embodiments and examples, there are many variations and modifications that will be apparent to those having ordinary skill in the art. As such, the described embodiments are to be considered in all respects as illustrative, and not restrictive. Therefore, the scope of the invention is indicated by the appended claims, rather than by the foregoing description. All changes that come within the meaning and range of equivalency of the claims are to be embraced within their scope.

What is claimed is:

1. A process for in-situ oxygen production and sour gas combustion using chemical looping combustion while producing a product stream comprising the steps of:
    reducing a bed of metal oxide oxygen carriers that is disposed on a perforated substrate in a lower portion of a fuel reactor to provide gas-phase oxygen which flows to a riser that is in fluid communication with the fuel reactor;
    delivering sour gas into the riser at a location that is downstream of the bed of metal oxide oxygen carriers such that the sour gas is free of direct contact with the metal oxide oxygen carriers;
    combusting the sour gas under oxy-combustion conditions within the riser to produce the product stream which includes $SO_2$;
    removing the $SO_2$ from the product stream;
    oxidizing the reduced metal oxides with air in an air reactor to produce the metal oxide oxygen carriers; and
    delivering the oxidized metal oxide oxygen carriers back to the fuel reactor.

2. The process of claim 1, wherein the bed is fluidized by a stream of $CO_2$, steam, or a combination thereof.

3. The process of claim 1, wherein the metal oxide oxygen carriers are copper-based, cobalt-based, manganese-based, or a mixture thereof.

4. The process of claim 1, wherein the metal oxide oxygen carriers are manganese-based oxygen carriers.

5. The process of claim 1, wherein the sour gas is a liquid feed that flows into an inlet formed in the riser at a location downstream of the fuel reactor.

6. The process of claim 1, wherein the product stream includes $CO_2$ and $H_2O$.

7. The process of claim 6, wherein the product stream further includes amounts of unburnt CO and $H_2$.

8. The process of claim 1, wherein heat and steam are generated as by-products.

9. A process for in-situ oxygen production and sour gas combustion using chemical looping combustion while producing a product stream comprising the steps of:
    reducing a bed of metal oxide oxygen carriers that is disposed on a perforated substrate in a lower portion of a fuel reactor to provide gas-phase oxygen which flows to a riser that is in fluid communication with the fuel reactor;
    delivering sour gas into the riser at a location that is downstream of the metal oxide oxygen carriers such that the sour gas is free of direct contact with the metal oxide oxygen carriers;
    combusting the sour gas under oxy-combustion conditions within the riser to produce the product stream which includes $SO_2$;
    removing the $SO_2$ from the product stream, wherein the $SO_2$ is removed from the product stream by reacting the $SO_2$ with a calcium-based sorbent that is introduced into the riser to form $CaSO_4$;
    oxidizing the reduced metal oxide with air in an air reactor to produce the metal oxide oxygen carriers; and
    delivering the oxidized metal oxide oxygen carriers back to the fuel reactor.

10. The process of claim 9, further including the step of separating the $CaSO_4$ from the product stream using a gas-solid separation device.

11. The process of claim 10, wherein the gas-solid separation device is a cyclone.

12. The process of claim 9, wherein at least a portion of the $CaSO_4$ is delivered back to the riser to act as a nonmetal oxygen carrier which provides additional oxygen as a result of reacting with the sour gas and other gases within the riser.

13. The process of claim 12, wherein the $CaSO_4$ reacts with CO and $H_2$ in the riser to produce $CO_2$ and steam.

14. The process of claim 12, further including the steps of reducing the $CaSO_4$ nonmetal oxygen carrier to CaS and separating the CaS from the product stream.

15. The process of claim 14, further including the step of oxidizing the separated CaS to form the $CaSO_4$ nonmetal oxygen carrier which is then delivered back to the riser.

16. The process of claim 15, wherein the step of oxidizing the separated CaS comprises the step of delivering the separated CaS to a hopper and injecting air into the hopper to oxidize the CaS to form the $CaSO_4$ nonmetal oxygen carrier which is delivered to the riser.

17. The process of claim 9, wherein the calcium-based sorbent is limestone.

18. The process of claim 9, wherein a ratio of Ca/S is between about 2 and 2.5.

19. A process for in-situ oxygen production and in-situ reduction of the emission of sulfur compounds that are produced during sour gas combustion using chemical looping combustion while producing a product stream comprising the steps of:
    reducing a metal oxide oxygen carrier that is disposed within a fuel reactor to provide gas-phase oxygen which flows to a riser that is in fluid communication with the fuel reactor;
    delivering sour gas into the riser at a location that is downstream of the metal oxide oxygen carrier such that the sour gas is free of direct contact with the metal oxide oxygen carrier;
    combusting the sour gas under oxy-combustion conditions within the riser to produce the product stream which includes $SO_2$;
    removing the $SO_2$ from the product stream in-situ within the riser by reacting the $SO_2$ with a calcium-based sorbent that is introduced into the riser and reacts with the $SO_2$ to form $CaSO_4$ which is separated from the product stream;

oxidizing the reduced metal oxide with air in an air reactor to produce the metal oxide oxygen carrier; and delivering the oxidized metal oxide oxygen carrier back to the fuel reactor.

20. The process of claim 19, further including the step of using the $CaSO_4$ which is separated from the product stream as a nonmetal oxygen carrier in the riser to increase sour gas conversion as a result of the $CaSO_4$ reacting with CO and $H_2$ in the riser to produce $CO_2$ and steam.

* * * * *